March 24, 1964 G. A. PETTERSSON 3,126,452

ARRANGEMENT IN TELEPHONE INSTRUMENTS

Filed March 14, 1961 2 Sheets-Sheet 1

INVENTOR
GUSTAF ADOLF PETTERSSON
BY Hane and Nydick
ATTORNEYS

ARRANGEMENT IN TELEPHONE INSTRUMENTS

Filed March 14, 1961 2 Sheets-Sheet 2

INVENTOR
GUSTAF ADOLF PETTERSSON
BY Hane and Nydick
ATTORNEYS

United States Patent Office 3,126,452

Patented Mar. 24, 1964

3,126,452

ARRANGEMENT IN TELEPHONE INSTRUMENTS

Gustaf Adolf Pettersson, Stockholm, Sweden, assignor to Telefonaktiebolaget L M Ericsson, Stockholm, Sweden, a corporation of Sweden Filed Mar. 14, 1961, Ser. No. 95,721
Claims priority, application Sweden Mar. 18, 1960
7 Claims. (Cl. 179—81)

The invention refers to arrangements in telephone instruments to protect an instrument against over-voltages arriving over the line.

Investigations have shown that, in the majority of cases, when a telephone instrument has been exposed to atmospheric over-voltages, the appearing damages must have been caused by transversal voltages, i.e. voltages between the line branches. Damages results at this on as well the talking circuit of the telephone instrument with its different details as speech transformer, telephone receiver and microphone as on its dial, in spite of the telephone instrument having been set in signalling position. The explanation to these damages will lie in that flash-overs have occurred in the cradle spring assembly of the telephone instrument in such a way that the high voltages arriving on the line branches have been transmitted to the talking circuit.

The present invention refers to an arrangement in telephone instrument, by which the risk for damages of the above kind is eliminated. The invention is mainly characterized by at least one conductor connected to the cradle switch spring assembly of the telephone instrument, by which conductor talking and dialling circuits of the telephone instrument are arranged to be short-circuited when the telephone instrument is set in signalling position.

The invention will be further described with reference to the accompanying drawings, in which FIGS. 1–6 are principal circuit diagrams of a telephone instrument, which figures show six different embodiments of the invention. FIG. 7 shows the invention applied to a more complete circuit diagram.

Figure 1:
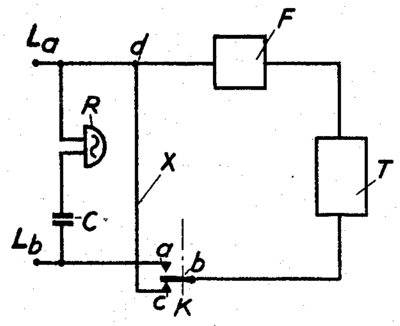

According to the invention an effective protection against damages in a telephone instrument caused by atmospheric over-voltages is obtained by the aid of a conductor, which in signal position short-circuits the talking and dialling circuits of the instrument. A telephone instrument having the talking circuit T, dialling circuit F, bell R with condenser C and cradle switch K is schematically shown in FIG. 1. $L_a$ and $L_b$ indicate the line branches of the instrument. The talking and dialling circuits T and F are singlepolarly disconnected from the incoming line by the cradle switch K when this is in signalling position. In talking position the cradle switch K connects the branch $L_b$ to the talking and dialling circuit TF. X indicates a conductor, which according to the invention short-circuits the talking and dialling circuits T respectively F when the instrument is in signalling position. The conductor X is then connected between the incoming line branch $L_a$ and a contact *c*, *b* on the cradle switch K in the embodiment shown in FIG. 1. In signalling position, i.e. when the microtelephone is replaced, the conductor X is connected so that it short-circuits the talking and dialling circuits T and F but is disconnected when the microtelephone is lifted. The bell R is here permanently connected between the line branches $L_a$ and $L_b$.

Figure 2:
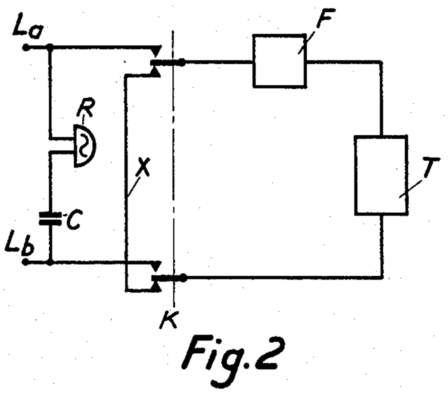

In FIG. 2 an embodiment of the invention is shown in connection with a telephone instrument having double pole disconnection of the talking and dialling circuits T and F in signalling position. The conductor X, which according to the invention short-circuits the talking and dialling circuits T and F, is here so connected between contact springs on respective cradle spring assembly of the cradle switch K that said circuits are short-circuited by the conductor X when the microtelephone is replaced. For the rest the instrument in FIG. 2 is identical to the one shown in FIG. 1.

Figure 3:
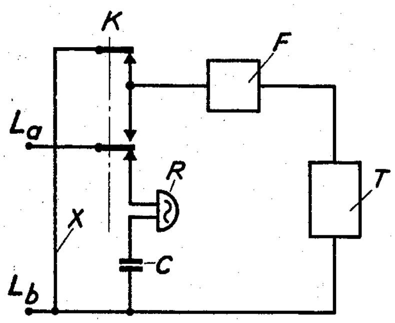

FIG. 3 shows an example of how a conductor X according to the invention can be connected in a telephone instrument having a bell, which during telephone communication is disconnected.

To get a low voltage drop over the conductor X, it ought to consist in all cases of a short and straight wire having as big a cross section as possible, e.g. a thick wire.

Figure 4:
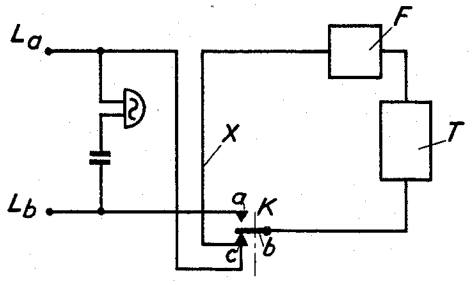

In FIGS. 1 and 4 the cradle switch K is connected to the line branch $L_b$. However, it can, of course, just as well be connected to the line branch $L_a$ as an alternative.

Figure 5:
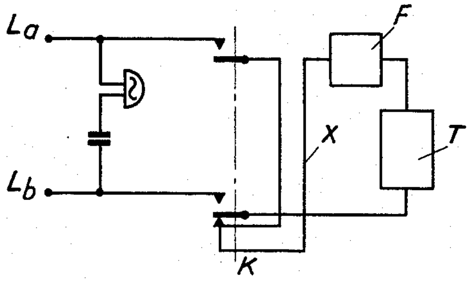
Figure 6:
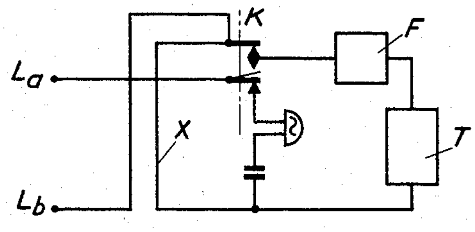
Figure 7:
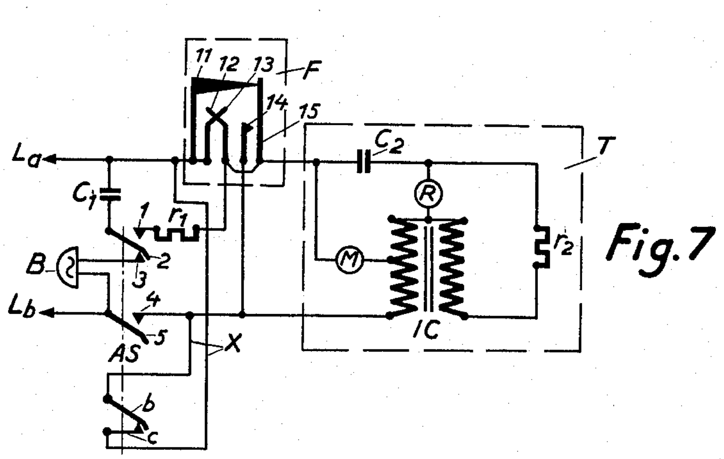

In FIGS. 4–6 three modifications of the invention as shown in FIGS. 1–3 are shown. FIG. 4 corresponds to FIG. 1, FIG. 5 to FIG. 2, FIG. 6 to FIG. 3 FIG. 7 shows the invention as applied to the circuit of U.S. Patent 2,915,512. In FIG. 1 for example the short-circuiting conductor K is branched from point *d* on the branch $L_a$, while the branch $L_a$ in the circuit according to FIG. 4 is directly connected to the contact *c* in the cradle switch K and first from this contact brought to the dialling and talking circuit. The conductor indicated X is thus divided into two conductors. The advantage of this becomes clear from the following.

At an arriving over-voltage wave the greatest portion of the potential drop will lie over the contact *a*—*b* and flash-over occurs here. The over-voltage wave arriving over $L_a$ (FIG. 1), which wave reaches point *d*, branches so that the greatest part passes through the conductor X and a smaller part through the F–T circuit. Through dividing the conductor X in two conductors according to FIG. 4 for example, the branching point *d* will lie at the contact C and flash-over occurs when the voltage wave reaches this contact, practically before the wave has been branched to the talking circuit TF, whereby the risk for the talking and dialling circuit being exposed to harmful voltages is even less than in FIG. 1.

In the now shown circuit diagrams the talking circuit and the dialling circuit are shown as rectangles, since the connection in the circuits may be formed in several different ways. For example the invention can be applied to circuits according to the U.S. Patent 2,915,592. In FIG. 7 of the drawing, our invention is shown applied to the circuit according to FIG. 5 in said U.S. patent. The short-circuiting contact *b*—*c*, which is controlled by the cradle switch AS, short-circuits (when the instrument is in the dialling position) the talking circuit and the dialling circuit over the conductor X, like at the previously shown embodiments according to FIGS. 1–6. For the rest only components are included in the circuit which are known per se in telephone instruments. The contacts 14, 15 are closed by the dial during the impulsing and short-circuit the talking circuit, and the contacts 11 and 15 are closed by the dial in resting position and short-circuit the impulse contacts 12, 13. During impulsing 11 and 15 are opened. R is a receiver, M a microphone, $r_1$ and $r_2$ resistances, IC indicates the transformer, $C_1$ and $C_2$ condensers, B the bell, AS the cradle switch. The resistance $r_1$ is connected by the cradle switch AS over the contact 1, 2 in series with $C_1$ and forms a spark extinguishing circuit for the impulse contacts 12, 13. Over the contact 4, 5 the connection of the branch $L_b$ with the talking circuit is broken, when the instrument is in signalling position. Over the contacts 2, 3 the connection of the condenser $C_1$ with the bell B is broken. The contacts 4, 5 and *b*, *c* may be combined to a make-and-break contact, and in each of the FIGS. 1–6, the circuits T and F may comprise the components shown in TF in FIG. 7.

I claim:

1. A telephone substation circuit comprising a pair of subscriber line conductors, a talking circuit including a receiver and a transmitter, a dialing circuit including an impulse sender, a cradle switch capable of taking a first position for local signalling and a second position for conversing, at least two contact springs controlled by said cradle switch position so as to respond to said first position by disengaging to disconnect said talking circuit and dialing circuit from said lines and to respond to said second position by engaging to bridge said talking circuit and dialing circuit across said lines, short-circuit conductor means across both said talking and dialing circuits and including at least two contact springs controlled by said cradle switch position so as to respond to said first position by engaging and to respond to said second position by disengaging.

2. A telephone substation circuit according to claim 1 wherein said talking circuit and said dialing circuit are connected in series.

3. A telephone substation circuit according to claim 1 wherein said two contact springs included in said short circuit conductor means and said two contact springs for bridging said talking and dialing circuits across said line conductors constitute a make-and-break contact.

4. A telephone substation circuit according to claim 1 wherein a second separate short-circuit conductor means is provided for short-circuiting across said lines and across said disengaged contacts by flash-over when said cradle switch is in said first position.

5. A telephone instrument according to claim 1, wherein one cradle switch spring group is provided in each of said line conductors for controlling the connection of said talking and dialing circuits to said line conductors, said short-circuit circuit being connected between a contact spring in the first one of said two spring groups, and a contact spring in the second of said groups.

6. A telephone substraction circuit according to claim 4, wherein said second separate short-circuiting conductor means includes said two contact springs for bridging said talking and dialing circuits across said line conductors, and said two contact springs included in said first-mentioned short-circuiting conductor means.

7. A telephone substation circuit according to claim 1, wherein said short-circuiting conductor means comprises a short straight wire having a large cross-section.

References Cited in the file of this patent

UNITED STATES PATENTS

| | | |
|---|---|---|
| 1,907,660 | Pfeiffer | May 9, 1933 |
| 2,214,259 | Pye | Sept. 10, 1940 |
| 2,394,275 | Tschumi | Feb. 5, 1946 |
| 2,643,300 | Stadelhofen et al. | June 23, 1953 |